(12) United States Patent
Hampel et al.

(10) Patent No.: US 9,930,513 B2
(45) Date of Patent: Mar. 27, 2018

(54) RESOURCE ALLOCATION FOR THE RELAYING OF DEVICE-TO-DEVICE DISCOVERY MESSAGES

(71) Applicant: QUALCOMM Incorporated, San Diego, CA (US)

(72) Inventors: Karl Georg Hampel, New York, NY (US); Hua Wang, Basking Ridge, NJ (US); Junyi Li, Chester, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 228 days.

(21) Appl. No.: 14/948,997

(22) Filed: Nov. 23, 2015

(65) Prior Publication Data

US 2017/0150485 A1    May 25, 2017

(51) Int. Cl.
*H04W 72/04* (2009.01)
*H04W 8/00* (2009.01)
*H04W 72/00* (2009.01)
*H04W 76/02* (2009.01)

(52) U.S. Cl.
CPC ......... *H04W 8/005* (2013.01); *H04W 72/005* (2013.01); *H04W 76/023* (2013.01)

(58) Field of Classification Search
CPC ........... H04W 72/044; H04W 72/0406; H04W 8/005; H04W 76/023
USPC ........................................ 370/328, 329, 331
See application file for complete search history.

(56) References Cited

U.S. PATENT DOCUMENTS

| | | |
|---|---|---|
| 9,072,000 B2 | 6/2015 | Tavildar et al. |
| 2011/0320570 A1* | 12/2011 | Ewing .................... H04W 4/00 709/218 |
| 2014/0105083 A1 | 4/2014 | Krishnaswamy et al. |
| 2014/0334435 A1* | 11/2014 | Al-Shalash ........... H04W 8/005 370/330 |
| 2015/0029866 A1 | 1/2015 | Liao et al. |

(Continued)

FOREIGN PATENT DOCUMENTS

| | | |
|---|---|---|
| WO | 2014098689 A1 | 6/2014 |
| WO | 2014113537 A1 | 7/2014 |

OTHER PUBLICATIONS

International Search Report and Written Opinion—PCT/US2016/059716—ISA/EPO—dated Jan. 30, 2017.

*Primary Examiner* — Afsar M Qureshi
(74) *Attorney, Agent, or Firm* — Arent Fox LLP

(57) ABSTRACT

A method, an apparatus, and a computer-readable medium for wireless communication are provided. The apparatus receives a discovery message through a device-to-device communication channel using a first resource element corresponding to a first time slot and a first frequency resource. The device-to-device communication channel may be a wireless communication channel. Upon reception of the discovery message, the apparatus determines a second resource element corresponding to a second time slot and a second frequency resource based on the first time slot and the first frequency resource in a deterministic resource allocation manner. The apparatus may alter the discovery message for rebroadcast in a deterministic message alteration manner. The apparatus rebroadcasts the discovery message using the second resource element. The discovery message may be rebroadcast through the same device-to-device communication channel in which the discovery message is received.

30 Claims, 13 Drawing Sheets

(56) References Cited

U.S. PATENT DOCUMENTS

| | | | |
|---|---|---|---|
| 2015/0078297 A1* | 3/2015 | Zheng | H04W 76/023 370/329 |
| 2015/0085697 A1 | 3/2015 | Gulati et al. | |
| 2015/0098382 A1 | 4/2015 | Duval et al. | |
| 2016/0105791 A1* | 4/2016 | Wang | H04W 8/005 370/335 |
| 2016/0128123 A1* | 5/2016 | Li | H04W 72/08 370/252 |
| 2016/0142898 A1* | 5/2016 | Poitau | H04W 72/0413 370/329 |
| 2016/0302051 A1* | 10/2016 | Lindoff | H04W 8/005 |
| 2017/0013640 A1* | 1/2017 | Loehr | H04W 76/023 |
| 2017/0245313 A1* | 8/2017 | Kim | H04W 76/023 |

\* cited by examiner

RESOURCE ALLOCATION FOR THE RELAYING OF DEVICE-TO-DEVICE DISCOVERY MESSAGES

BACKGROUND

Field

The present disclosure relates generally to communication systems, and more particularly, to the relaying of device-to-device discovery messages.

Background

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is Long Term Evolution (LTE). LTE is a set of enhancements to the Universal Mobile Telecommunications System (UMTS) mobile standard promulgated by Third Generation Partnership Project (3GPP). LTE is designed to better support mobile broadband Internet access by improving spectral efficiency, lowering costs, improving services, making use of new spectrum, and better integrating with other open standards using OFDMA on the downlink (DL), SC-FDMA on the uplink (UL), and multiple-input multiple-output (MIMO) antenna technology. However, as the demand for mobile broadband access continues to increase, there exists a need for further improvements in LTE technology. Preferably, these improvements should be applicable to other multi-access technologies and the telecommunication standards that employ these technologies.

SUMMARY

In an aspect of the disclosure, a method, a computer-readable medium, and an apparatus for wireless communication are provided. The apparatus receives a discovery message through a device-to-device communication channel using a first resource element corresponding to a first time slot and on a first frequency resource. Upon reception of the discovery message, the apparatus determines a second resource element corresponding to a second time slot and a second frequency resource based on the first time slot and the first frequency resource in a deterministic resource allocation manner. The apparatus may alter the discovery message for rebroadcast in a deterministic message alteration manner. The apparatus rebroadcasts the discovery message using the second resource element.

DETAILED DESCRIPTION

Figure 1:
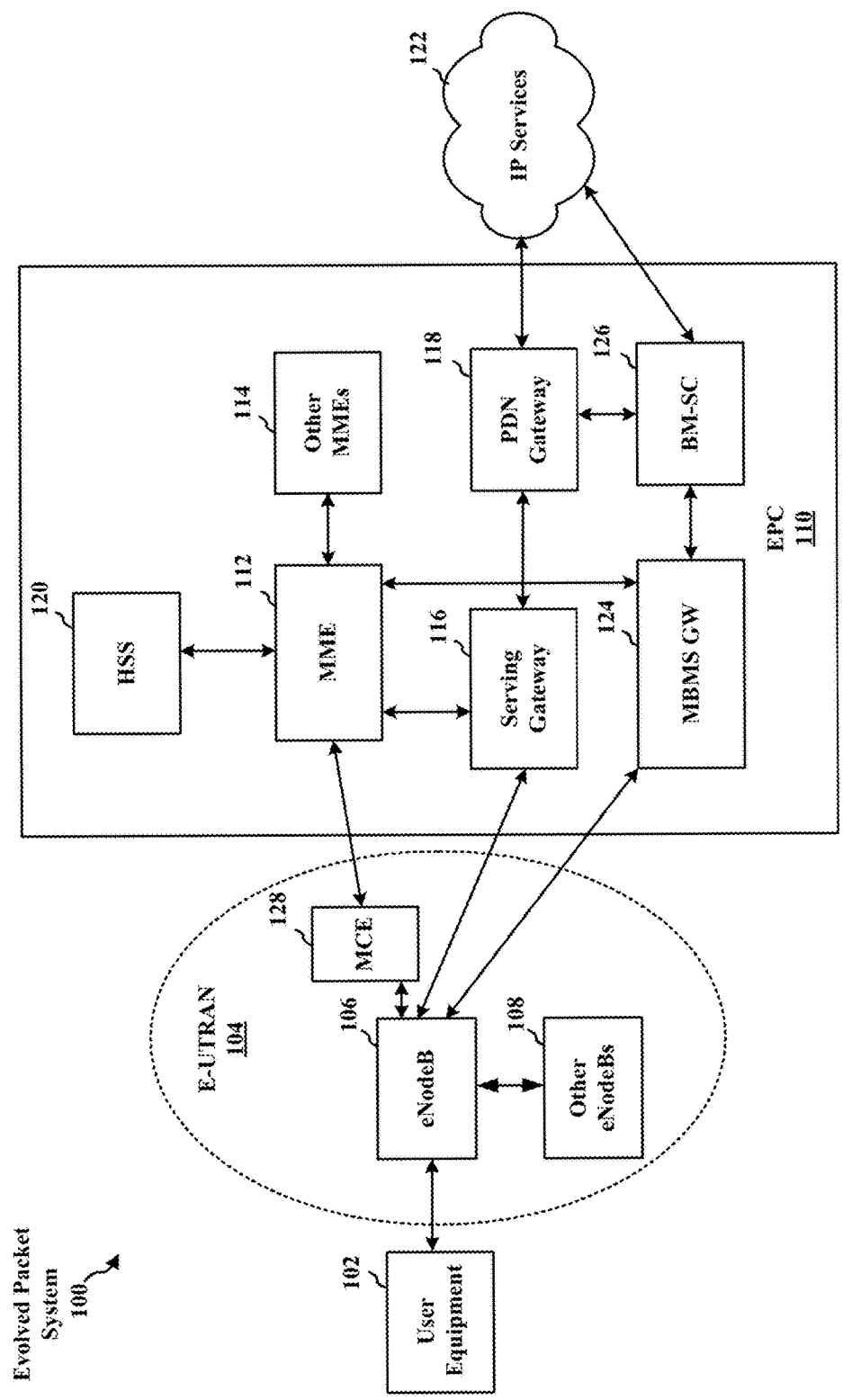
FIG. 1 is a diagram illustrating an example of a network architecture.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, components, circuits, steps, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented with a "processing system" that includes one or more processors. Examples of processors include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more exemplary embodiments, the functions described may be implemented in hardware, software, firmware, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), compact disk ROM (CD-ROM) or other optical disk storage, magnetic disk storage or other magnetic storage devices, combinations of the aforementioned types of computer-readable media, or any other medium that can be used to store computer executable code in the form of instructions or data structures that can be accessed by a computer.

FIG. 1 is a diagram illustrating an LTE network architecture 100. The LTE network architecture 100 may be referred to as an Evolved Packet System (EPS) 100. The EPS 100 may include one or more user equipment (UE) 102, an Evolved UMTS Terrestrial Radio Access Network (E-UTRAN) 104, an Evolved Packet Core (EPC) 110, and an Operator's Internet Protocol (IP) Services 122. The EPS can interconnect with other access networks, but for simplicity those entities/interfaces are not shown. As shown, the EPS provides packet-switched services, however, as those skilled in the art will readily appreciate, the various concepts presented throughout this disclosure may be extended to networks providing circuit-switched services.

The E-UTRAN includes the evolved Node B (eNB) 106 and other eNBs 108, and may include a Multicast Coordination Entity (MCE) 128. The eNB 106 provides user and control planes protocol terminations toward the UE 102. The eNB 106 may be connected to the other eNBs 108 via a backhaul (e.g., an X2 interface). The MCE 128 allocates time/frequency radio resources for evolved Multimedia Broadcast Multicast Service (MBMS) (eMBMS), and determines the radio configuration (e.g., a modulation and coding scheme (MCS)) for the eMBMS. The MCE 128 may be a separate entity or part of the eNB 106. The eNB 106 may also be referred to as a base station, a Node B, an access point, a base transceiver station, a radio base station, a radio transceiver, a transceiver function, a basic service set (BSS), an extended service set (ESS), or some other suitable terminology. The eNB 106 provides an access point to the EPC 110 for a UE 102. Examples of UEs 102 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a wearable device, a smart watch, or any other similar functioning device. The UE 102 may also be referred to by those skilled in the art as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

The eNB 106 is connected to the EPC 110. The EPC 110 may include a Mobility Management Entity (MME) 112, a Home Subscriber Server (HSS) 120, other MMEs 114, a Serving Gateway 116, a Multimedia Broadcast Multicast Service (MBMS) Gateway 124, a Broadcast Multicast Service Center (BM-SC) 126, and a Packet Data Network (PDN) Gateway 118. The MME 112 is the control node that processes the signaling between the UE 102 and the EPC 110. Generally, the MME 112 provides bearer and connection management. All user IP packets are transferred through the Serving Gateway 116, which itself is connected to the PDN Gateway 118. The PDN Gateway 118 provides UE IP address allocation as well as other functions. The PDN Gateway 118 and the BM-SC 126 are connected to the IP Services 122. The IP Services 122 may include the Internet, an intranet, an IP Multimedia Subsystem (IMS), a PS Streaming Service (PSS), and/or other IP services. The BM-SC 126 may provide functions for MBMS user service provisioning and delivery. The BM-SC 126 may serve as an entry point for content provider MBMS transmission, may be used to authorize and initiate MBMS Bearer Services within a public land mobile network (PLMN), and may be used to schedule and deliver MBMS transmissions. The MBMS Gateway 124 may be used to distribute MBMS traffic to the eNBs (e.g., 106, 108) belonging to a Multicast Broadcast Single Frequency Network (MBSFN) area broadcasting a particular service, and may be responsible for session management (start/stop) and for collecting eMBMS related charging information.

Figure 2:
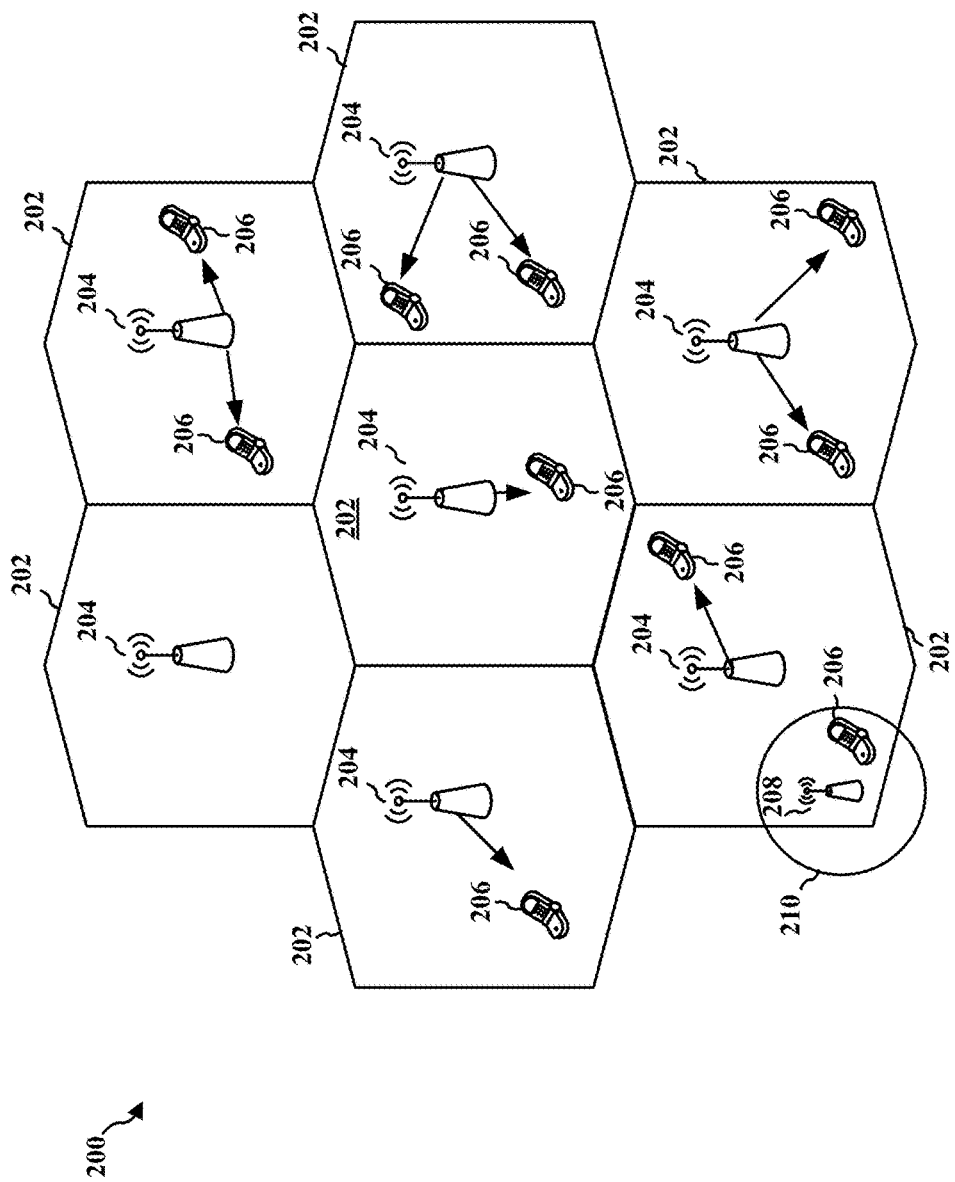
FIG. 2 is a diagram illustrating an example of an access network.

FIG. 2 is a diagram illustrating an example of an access network 200 in an LTE network architecture. In this example, the access network 200 is divided into a number of cellular regions (cells) 202. One or more lower power class eNBs 208 may have cellular regions 210 that overlap with one or more of the cells 202. The lower power class eNB 208 may be a femto cell (e.g., home eNB (HeNB)), pico cell, micro cell, or remote radio head (RRH). The macro eNBs 204 are each assigned to a respective cell 202 and are configured to provide an access point to the EPC 110 for all the UEs 206 in the cells 202. There is no centralized controller in this example of an access network 200, but a centralized controller may be used in alternative configurations. The eNBs 204 are responsible for all radio related functions including radio bearer control, admission control, mobility control, scheduling, security, and connectivity to the serving gateway 116. An eNB may support one or multiple (e.g., three) cells (also referred to as a sectors). The term "cell" can refer to the smallest coverage area of an eNB and/or an eNB subsystem serving a particular coverage area. Further, the terms "eNB," "base station," and "cell" may be used interchangeably herein.

The modulation and multiple access scheme employed by the access network 200 may vary depending on the particular telecommunications standard being deployed. In LTE applications, OFDM is used on the DL and SC-FDMA is used on the UL to support both frequency division duplex (FDD) and time division duplex (TDD). As those skilled in the art will readily appreciate from the detailed description to follow, the various concepts presented herein are well suited for LTE applications. However, these concepts may be readily extended to other telecommunication standards employing other modulation and multiple access techniques. By way of example, these concepts may be extended to Evolution-Data Optimized (EV-DO) or Ultra Mobile Broadband (UMB). EV-DO and UMB are air interface standards promulgated by the 3rd Generation Partnership Project 2 (3GPP2) as part of the CDMA2000 family of standards and employs CDMA to provide broadband Internet access to mobile stations. These concepts may also be extended to Universal Terrestrial Radio Access (UTRA) employing Wideband-CDMA (W-CDMA) and other variants of CDMA, such as TD-SCDMA; Global System for Mobile Communications (GSM) employing TDMA; and Evolved UTRA (E-UTRA), IEEE 802.11 (Wi-Fi), IEEE 802.16 (Wi-MAX), IEEE 802.20, and Flash-OFDM employing OFDMA. UTRA, E-UTRA, UMTS, LTE and GSM are described in documents from the 3GPP organization. CDMA2000 and UMB are described in documents from the 3GPP2 organization. The actual wireless communication standard and the multiple access technology employed will depend on the specific application and the overall design constraints imposed on the system.

The eNBs 204 may have multiple antennas supporting MIMO technology. The use of MIMO technology enables the eNBs 204 to exploit the spatial domain to support spatial multiplexing, beamforming, and transmit diversity. Spatial multiplexing may be used to transmit different streams of data simultaneously on the same frequency. The data streams may be transmitted to a single UE 206 to increase the data rate or to multiple UEs 206 to increase the overall system capacity. This is achieved by spatially precoding each data stream (i.e., applying a scaling of an amplitude and a phase) and then transmitting each spatially precoded stream through multiple transmit antennas on the DL. The spatially precoded data streams arrive at the UE(s) 206 with different spatial signatures, which enables each of the UE(s) 206 to recover the one or more data streams destined for that UE 206. On the UL, each UE 206 transmits a spatially precoded data stream, which enables the eNB 204 to identify the source of each spatially precoded data stream.

Spatial multiplexing is generally used when channel conditions are good. When channel conditions are less favorable, beamforming may be used to focus the transmission energy in one or more directions. This may be achieved by spatially precoding the data for transmission through multiple antennas. To achieve good coverage at the edges of the cell, a single stream beamforming transmission may be used in combination with transmit diversity.

In the detailed description that follows, various aspects of an access network will be described with reference to a MIMO system supporting OFDM on the DL. OFDM is a spread-spectrum technique that modulates data over a number of subcarriers within an OFDM symbol. The subcarriers are spaced apart at precise frequencies. The spacing provides "orthogonality" that enables a receiver to recover the data from the subcarriers. In the time domain, a guard interval (e.g., cyclic prefix) may be added to each OFDM symbol to combat inter-OFDM-symbol interference. The UL may use SC-FDMA in the form of a DFT-spread OFDM signal to compensate for high peak-to-average power ratio (PAPR).

Figure 3:
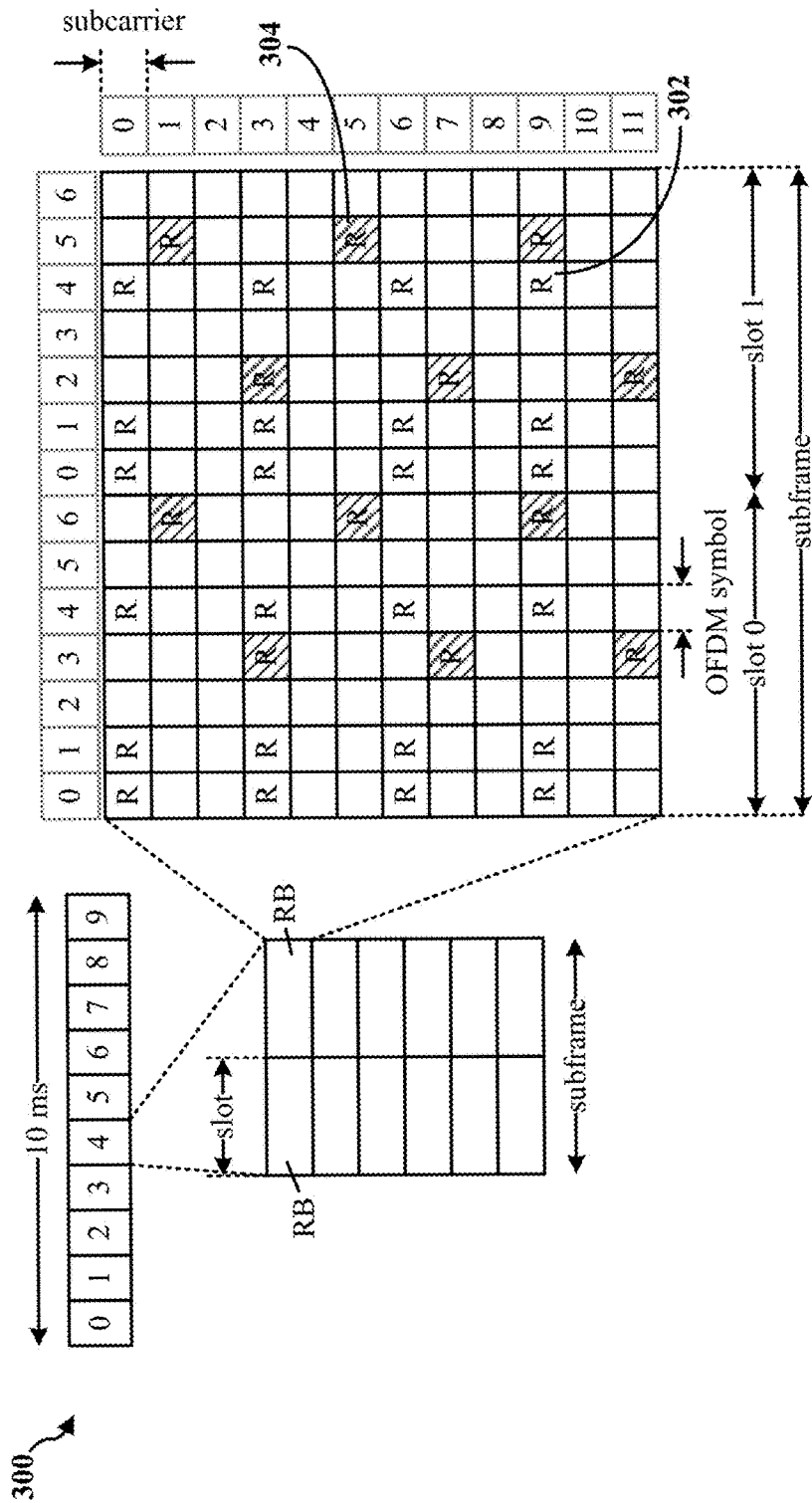
FIG. 3 is a diagram illustrating an example of a DL frame structure in LTE.

FIG. 3 is a diagram 300 illustrating an example of a DL frame structure in LTE. A frame (10 ms) may be divided into 10 equally sized subframes. Each subframe may include two consecutive time slots. A resource grid may be used to represent two time slots, each time slot including a resource block. The resource grid is divided into multiple resource elements. In LTE, for a normal cyclic prefix, a resource block contains 12 consecutive subcarriers in the frequency domain and 7 consecutive OFDM symbols in the time domain, for a total of 84 resource elements. For an extended cyclic prefix, a resource block contains 12 consecutive subcarriers in the frequency domain and 6 consecutive OFDM symbols in the time domain, for a total of 72 resource elements. Some of the resource elements, indicated as R 302, 304, include DL reference signals (DL-RS). The DL-RS include Cell-specific RS (CRS) (also sometimes called common RS) 302 and UE-specific RS (UE-RS) 304. UE-RS 304 are transmitted on the resource blocks upon which the corresponding physical DL shared channel (PDSCH) is mapped. The number of bits carried by each resource element depends on the modulation scheme. Thus, the more resource blocks that a UE receives and the higher the modulation scheme, the higher the data rate for the UE.

Figure 4:
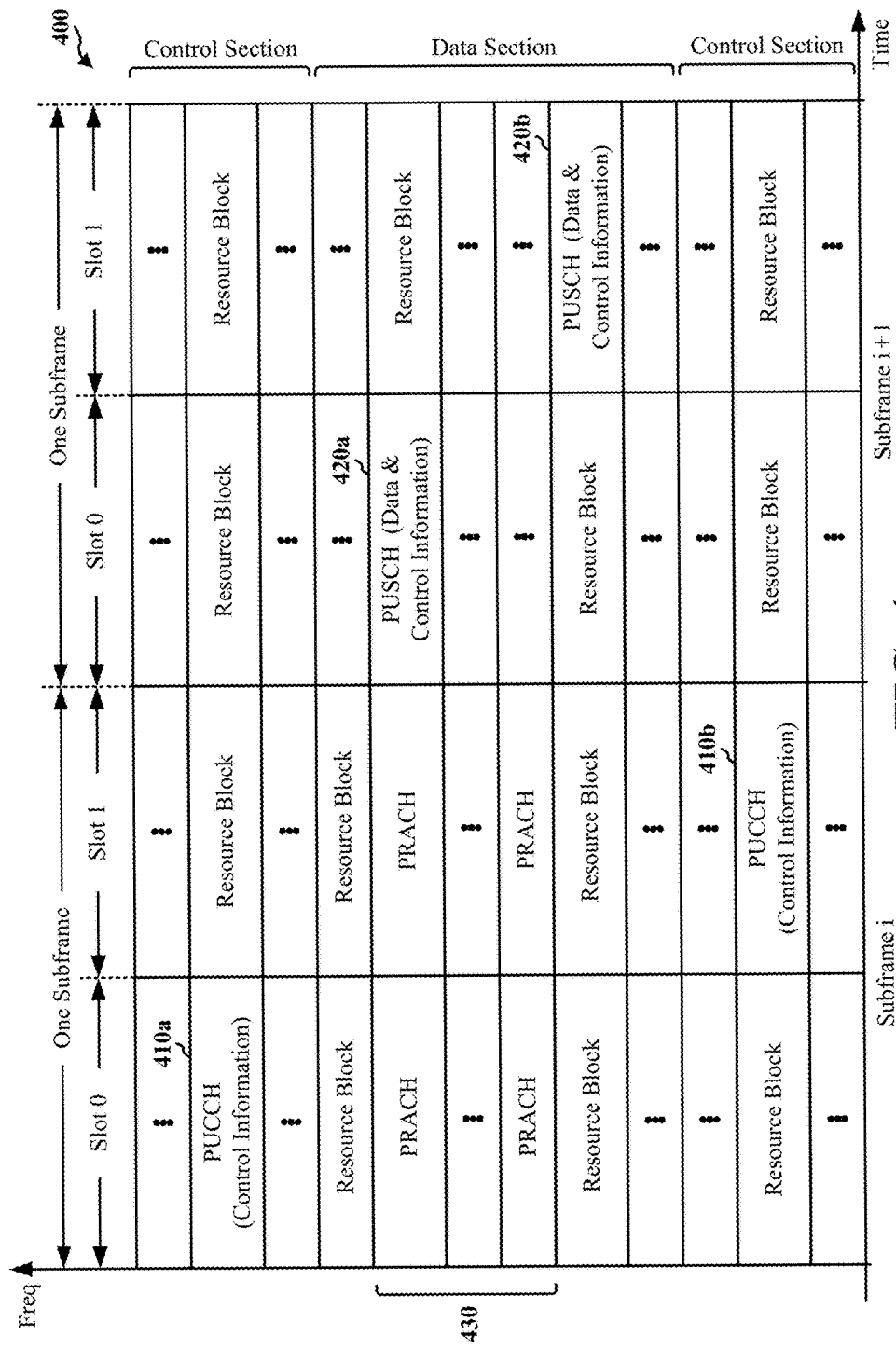
FIG. 4 is a diagram illustrating an example of an UL frame structure in LTE.

FIG. 4 is a diagram 400 illustrating an example of an UL frame structure in LTE. The available resource blocks for the UL may be partitioned into a data section and a control section. The control section may be formed at the two edges of the system bandwidth and may have a configurable size. The resource blocks in the control section may be assigned to UEs for transmission of control information. The data section may include all resource blocks not included in the control section. The UL frame structure results in the data section including contiguous subcarriers, which may allow a single UE to be assigned all of the contiguous subcarriers in the data section.

A UE may be assigned resource blocks 410a, 410b in the control section to transmit control information to an eNB. The UE may also be assigned resource blocks 420a, 420b in the data section to transmit data to the eNB. The UE may transmit control information in a physical UL control channel (PUCCH) on the assigned resource blocks in the control section. The UE may transmit data or both data and control information in a physical UL shared channel (PUSCH) on the assigned resource blocks in the data section. A UL transmission may span both slots of a subframe and may hop across frequency.

A set of resource blocks may be used to perform initial system access and achieve UL synchronization in a physical random access channel (PRACH) 430. The PRACH 430 carries a random sequence and cannot carry any UL data/signaling. Each random access preamble occupies a bandwidth corresponding to six consecutive resource blocks. The starting frequency is specified by the network. That is, the transmission of the random access preamble is restricted to certain time and frequency resources. There is no frequency hopping for the PRACH. The PRACH attempt is carried in a single subframe (1 ms) or in a sequence of few contiguous subframes and a UE can make a single PRACH attempt per frame (10 ms).

Figure 5:
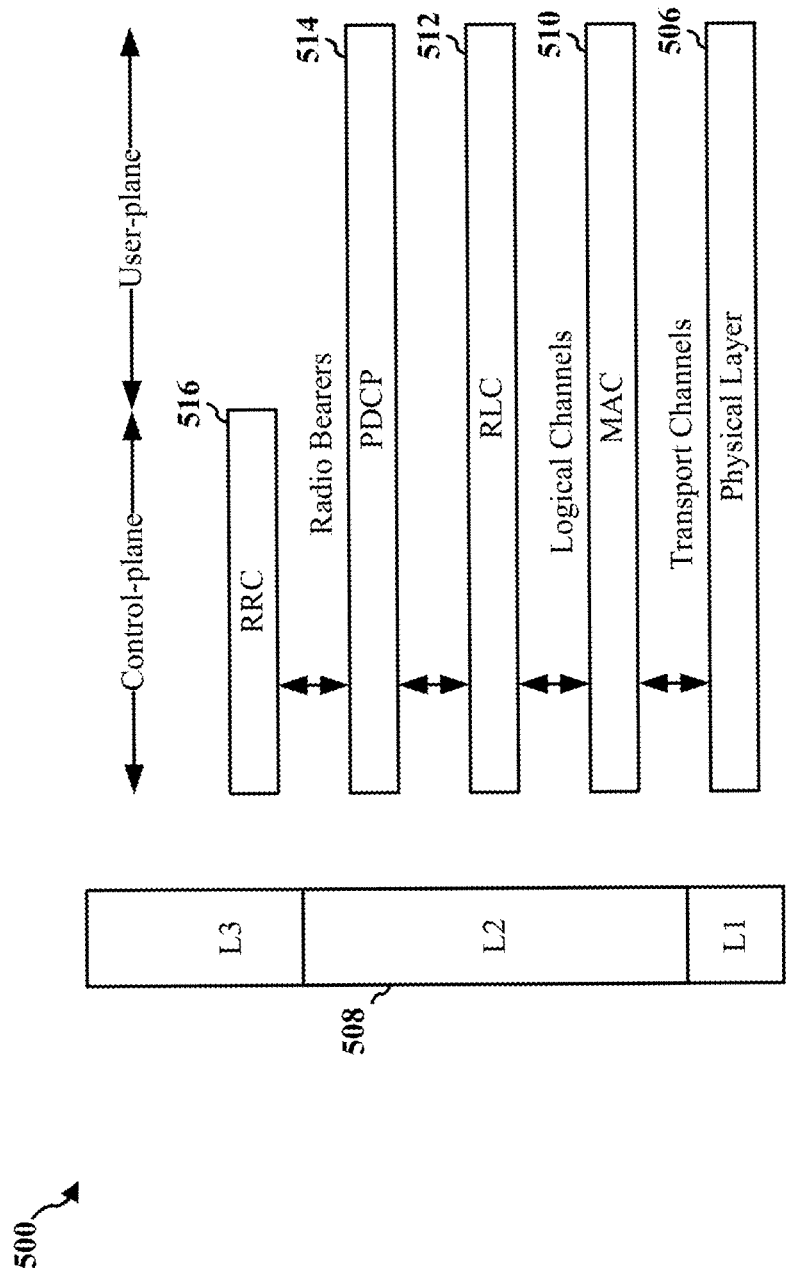
FIG. 5 is a diagram illustrating an example of a radio protocol architecture for the user and control planes.

FIG. 5 is a diagram 500 illustrating an example of a radio protocol architecture for the user and control planes in LTE. The radio protocol architecture for the UE and the eNB is shown with three layers: Layer 1, Layer 2, and Layer 3. Layer 1 (L1 layer) is the lowest layer and implements various physical layer signal processing functions. The L1 layer will be referred to herein as the physical layer 506. Layer 2 (L2 layer) 508 is above the physical layer 506 and is responsible for the link between the UE and eNB over the physical layer 506.

In the user plane, the L2 layer 508 includes a media access control (MAC) sublayer 510, a radio link control (RLC) sublayer 512, and a packet data convergence protocol (PDCP) 514 sublayer, which are terminated at the eNB on the network side. Although not shown, the UE may have several upper layers above the L2 layer 508 including a network layer (e.g., IP layer) that is terminated at the PDN gateway 118 on the network side, and an application layer that is terminated at the other end of the connection (e.g., far end UE, server, etc.).

The PDCP sublayer 514 provides multiplexing between different radio bearers and logical channels. The PDCP sublayer 514 also provides header compression for upper layer data packets to reduce radio transmission overhead, security by ciphering the data packets, and handover support for UEs between eNBs. The RLC sublayer 512 provides segmentation and reassembly of upper layer data packets, retransmission of lost data packets, and reordering of data packets to compensate for out-of-order reception due to hybrid automatic repeat request (HARQ). The MAC sublayer 510 provides multiplexing between logical and transport channels. The MAC sublayer 510 is also responsible for allocating the various radio resources (e.g., resource blocks) in one cell among the UEs. The MAC sublayer 510 is also responsible for HARQ operations.

In the control plane, the radio protocol architecture for the UE and eNB is substantially the same for the physical layer 506 and the L2 layer 508 with the exception that there is no header compression function for the control plane. The control plane also includes a radio resource control (RRC) sublayer 516 in Layer 3 (L3 layer). The RRC sublayer 516 is responsible for obtaining radio resources (e.g., radio bearers) and for configuring the lower layers using RRC signaling between the eNB and the UE.

Figure 6:
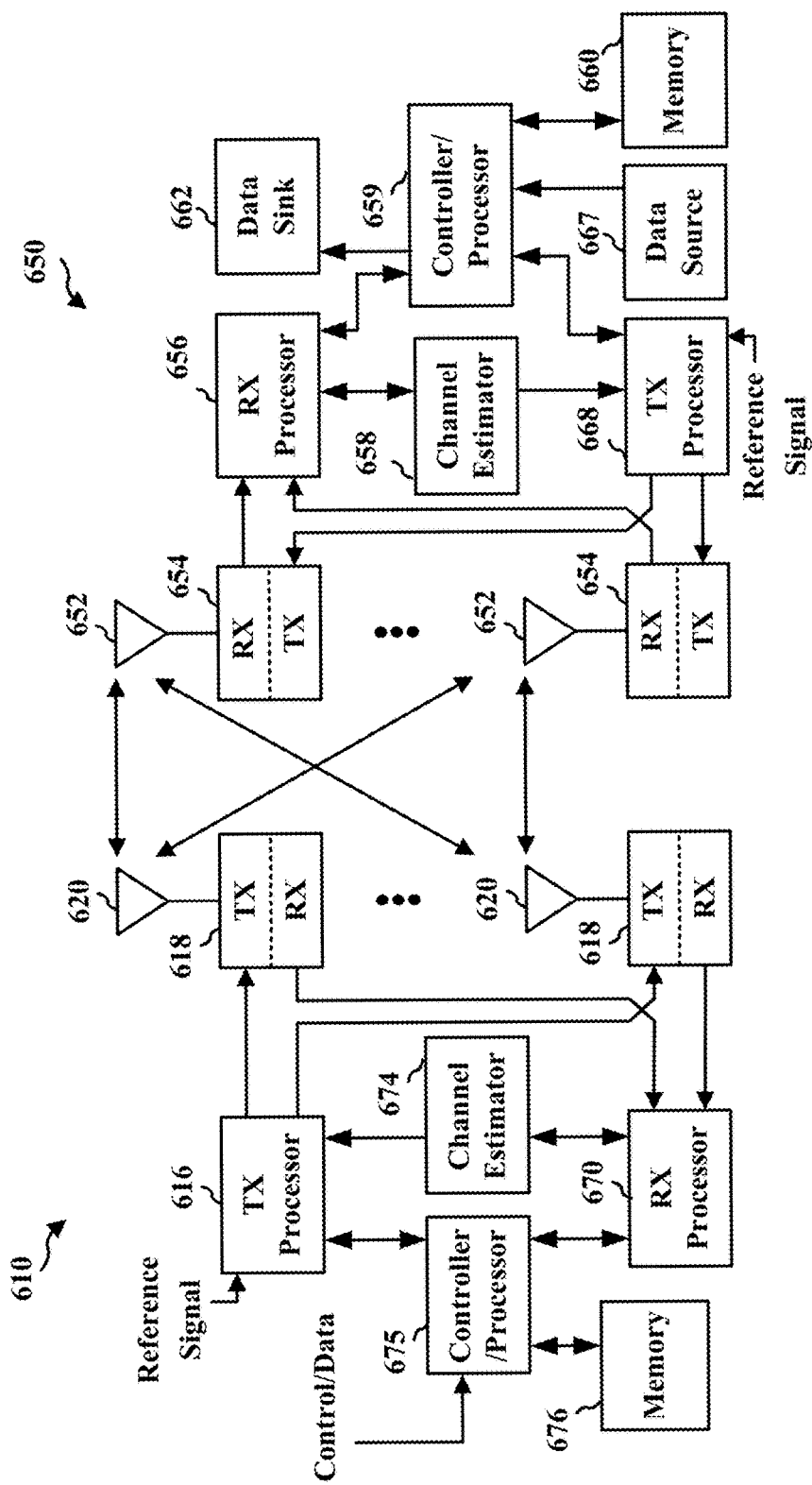
FIG. 6 is a diagram illustrating an example of an evolved Node B and user equipment in an access network.

FIG. 6 is a block diagram of an eNB 610 in communication with a UE 650 in an access network. In the DL, upper layer packets from the core network are provided to a controller/processor 675. The controller/processor 675 implements the functionality of the L2 layer. In the DL, the controller/processor 675 provides header compression, ciphering, packet segmentation and reordering, multiplexing between logical and transport channels, and radio resource allocations to the UE 650 based on various priority metrics. The controller/processor 675 is also responsible for HARQ operations, retransmission of lost packets, and signaling to the UE 650.

The transmit (TX) processor 616 implements various signal processing functions for the L1 layer (i.e., physical layer). The signal processing functions include coding and interleaving to facilitate forward error correction (FEC) at the UE 650 and mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols are then split into parallel streams. Each stream is then mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 674 may be used to determine the coding and modulation scheme, as well as for spatial processing. The channel estimate may be derived from a reference signal and/or channel condition feedback transmitted by the UE 650. Each spatial stream may then be provided to a different antenna 620 via a separate transmitter 618TX. Each transmitter 618TX may modulate an RF carrier with a respective spatial stream for transmission.

At the UE 650, each receiver 654RX receives a signal through its respective antenna 652. Each receiver 654RX recovers information modulated onto an RF carrier and provides the information to the receive (RX) processor 656. The RX processor 656 implements various signal processing functions of the L1 layer. The RX processor 656 may perform spatial processing on the information to recover any spatial streams destined for the UE 650. If multiple spatial streams are destined for the UE 650, they may be combined by the RX processor 656 into a single OFDM symbol stream. The RX processor 656 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the eNB 610. These soft decisions may be based on channel estimates computed by the channel estimator 658. The soft decisions are then decoded and deinterleaved to recover the data and control signals that were originally transmitted by the eNB 610 on the physical channel. The data and control signals are then provided to the controller/processor 659.

The controller/processor 659 implements the L2 layer. The controller/processor 659 can be associated with a memory 660 that stores program codes and data. The memory 660 may be referred to as a computer-readable medium. In the UL, the controller/processor 659 provides demultiplexing between transport and logical channels, packet reassembly, deciphering, header decompression, control signal processing to recover upper layer packets from the core network. The upper layer packets are then provided to a data sink 662, which represents all the protocol layers above the L2 layer. Various control signals may also be provided to the data sink 662 for L3 processing. The controller/processor 659 is also responsible for error detection using an acknowledgement (ACK) and/or negative acknowledgement (NACK) protocol to support HARQ operations.

In the UL, a data source 667 is used to provide upper layer packets to the controller/processor 659. The data source 667 represents all protocol layers above the L2 layer. Similar to the functionality described in connection with the DL transmission by the eNB 610, the controller/processor 659 implements the L2 layer for the user plane and the control plane by providing header compression, ciphering, packet segmentation and reordering, and multiplexing between logical and transport channels based on radio resource allocations by the eNB 610. The controller/processor 659 is also responsible for HARQ operations, retransmission of lost packets, and signaling to the eNB 610.

Channel estimates derived by a channel estimator 658 from a reference signal or feedback transmitted by the eNB 610 may be used by the TX processor 668 to select the appropriate coding and modulation schemes, and to facilitate spatial processing. The spatial streams generated by the TX processor 668 may be provided to different antenna 652 via separate transmitters 654TX. Each transmitter 654TX may modulate an RF carrier with a respective spatial stream for transmission.

The UL transmission is processed at the eNB 610 in a manner similar to that described in connection with the receiver function at the UE 650. Each receiver 618RX receives a signal through its respective antenna 620. Each receiver 618RX recovers information modulated onto an RF carrier and provides the information to a RX processor 670. The RX processor 670 may implement the L1 layer.

The controller/processor 675 implements the L2 layer. The controller/processor 675 can be associated with a memory 676 that stores program codes and data. The memory 676 may be referred to as a computer-readable medium. In the UL, the controller/processor 675 provides demultiplexing between transport and logical channels, packet reassembly, deciphering, header decompression, control signal processing to recover upper layer packets from the UE 650. Upper layer packets from the controller/processor 675 may be provided to the core network. The controller/processor 675 is also responsible for error detection using an ACK and/or NACK protocol to support HARQ operations.

Figure 7:
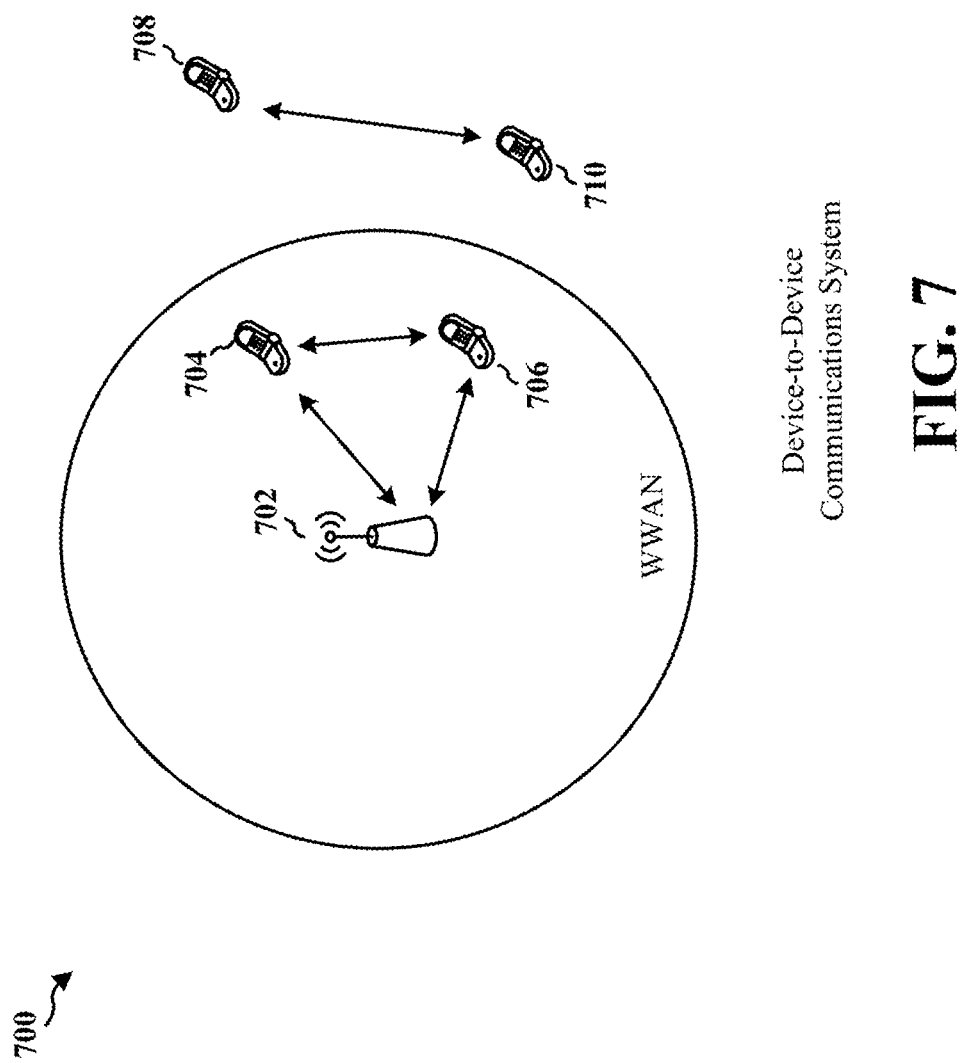
FIG. 7 is a diagram of a device-to-device communications system.

FIG. 7 is a diagram of a device-to-device (D2D) communications system 700. The device-to-device communications system 700 includes a plurality of wireless devices 704, 706, 708, 710. The device-to-device communications system 700 may overlap with a cellular communications system, such as for example, a wireless wide area network (WWAN). Some of the wireless devices 704, 706, 708, 710 may communicate together in device-to-device communication using the DL/UL WWAN spectrum, some may communicate with the base station 702, and some may do both. For example, as shown in FIG. 7, the wireless devices 708, 710 are in device-to-device communication and the wireless devices 704, 706 are in device-to-device communication. The wireless devices 704, 706 are also communicating with the base station 702.

The exemplary methods and apparatuses discussed infra are applicable to any of a variety of wireless device-to-device communications systems, such as for example, a wireless device-to-device communication system based on FlashLinQ, WiMedia, Bluetooth, ZigBee, or Wi-Fi based on the IEEE 802.11 standard. To simplify the discussion, the exemplary methods and apparatus are discussed within the context of LTE. However, one of ordinary skill in the art would understand that the exemplary methods and apparatuses are applicable more generally to a variety of other wireless device-to-device communication systems.

Proximity services (ProSe) render information with proximity relevance to subscribers of mobile devices. Proximity services, for instance, may be used by advertising points to deliver coupons to subscribers who pass a store where these coupons can be redeemed. In another use case, proximity services are exploited by friend-finder applications that alert subscribers upon (unknowingly) approaching the location of one of their friends or family members.

Proximity services can be realized via device-to-device discovery mechanisms as supported by a device-to-device communication system, for example, based on LTE-Direct (LTE-D). Such mechanisms provide wireless resources which are used by mobile devices to receive discovery messages transmitted by peer devices. Due to the finite propagation of the wireless signals, such D2D discovery messages are inherently range-limited hence conveying the experience of proximity upon detection.

While the discovery range is inherently determined by the wireless signal propagation environment and the power levels of the participating devices, the desired proximity range is defined by the superseding application, which may be significantly different from the discovery range. Especially in urban environments, where wireless signal propagation is limited due to the dense infrastructure, the discovery range may be too small for many proximity services.

One way to address this mismatch between the discovery range and the desired proximity range is to allow discovery messages to be rebroadcast (relayed) by discovering devices (i.e., the device receiving the discovery message) and therefore propagate along two or more hops. For such rebroadcasts, additional MAC layer resources may be allocated. Since multiple devices may receive and rebroadcast the same message, in one configuration, resource allocation may occur in a manner that minimizes the interference due to rebroadcasts while maximizing the benefit of multiple rebroadcasts. In such configuration, a resource allocation scheme is proposed for a time-slotted MAC layer.

In one configuration, rebroadcast of the same message by multiple devices may be coordinated by having each rebroadcasting device allocate a time slot and frequency resource that is derived in a deterministic resource allocation manner from the time slot and frequency resource where the original message is received. Further, all message alterations prior to rebroadcast (bit stream and waveform changes) may be executed in a deterministic message alteration manner. In such configuration, the utilization of resources used for rebroadcast of the same message by multiple devices may be minimized. Moreover, over the air (OTA) combining of multiple rebroadcast signals at the antenna of a rebroadcast receiver may be performed, leading to a statistically higher signal strength.

Figure 8:
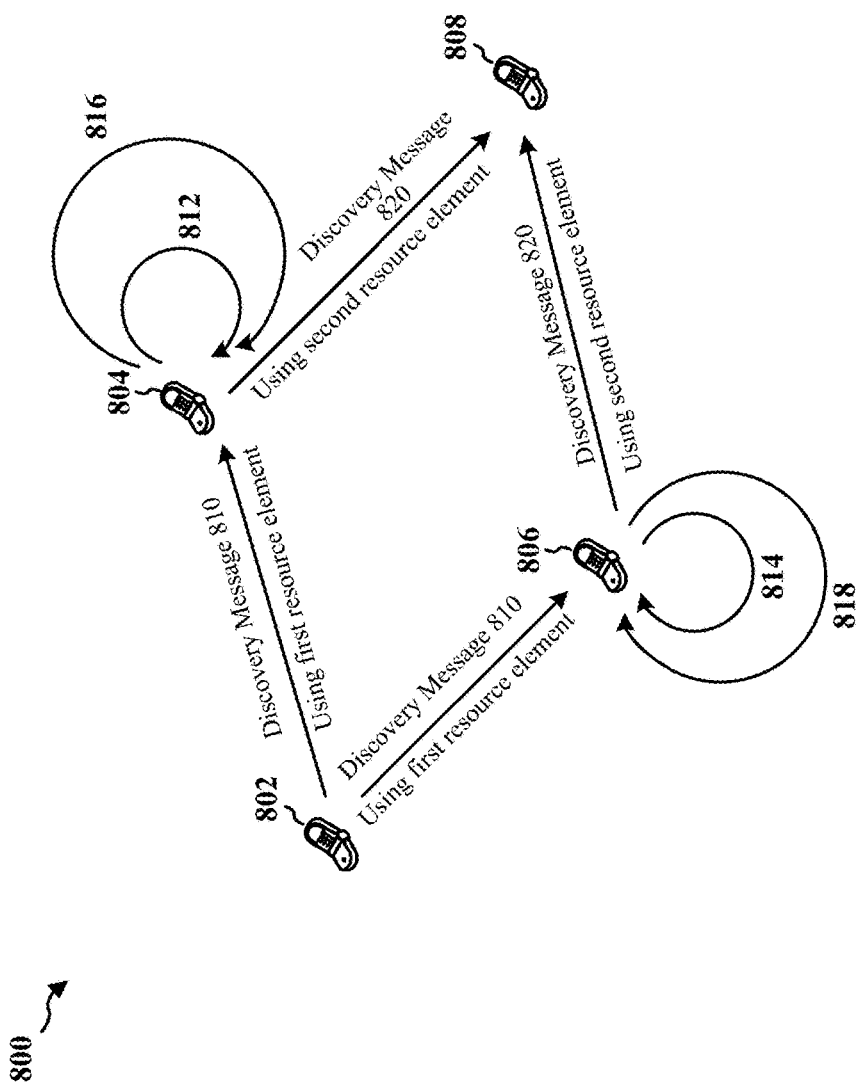
FIG. 8 is a diagram illustrating an example of resource allocation for the relaying of device-to-device discovery messages in a device-to-device communications system.

FIG. 8 is a diagram illustrating an example of resource allocation for the relaying of device-to-device discovery messages in a device-to-device communications system 800. The D2D communications system 800 includes several wireless devices 802, 804, 806, and 808. Some of the wireless devices 802, 804, 806, and 808 may communicate together in device-to-device communication using the DL/UL WWAN spectrum. For example, as shown in FIG. 8, the wireless device 802 is in device-to-device communication with wireless devices 804 and 806. The wireless devices 804 and 806 are also in device-to-device communication with wireless device 808. In one configuration, each of the wireless devices 802, 804, 806, and 808 may be a UE (e.g., the UE 102 or 206).

In one configuration, the wireless device 802 broadcasts a discovery message 810 through a D2D communication channel using a MAC layer resource (e.g., a first resource element corresponding to a first time slot and a first frequency). The discovery message 810 may be received by the wireless devices 804 and 806. Upon reception of the discovery message 810 on the D2D channel from the wireless device 802, the wireless device 804 determines (at 812) a MAC layer resource for rebroadcast (e.g., a second resource element corresponding to a second time slot and a second frequency) based on the MAC layer resource for receiving the discovery message 810 (e.g., the first resource element corresponding to the first time slot and the first frequency) in a deterministic resource allocation manner. In one configuration, the deterministic resource allocation manner refers to a manner that can be equally applied by all re-broadcasters (e.g., 804 and 806) of the same discovery message (e.g., 810). In one configuration, the deterministic resource allocation manner ensures that all re-broadcasters (e.g., 804 and 806) of the same discovery message determine the same MAC layer resource for rebroadcast of the discovery message.

In one configuration, the first resource element may be within a first frame. In such configuration, the deterministic resource allocation manner may refer to determining the second resource element that is the same resource element within a second frame that is a fixed number of frames after the first frame.

In one configuration, the deterministic resource allocation manner may refer to the addition of an offset to the first time slot and/or the addition of an offset to the first frequency. In one configuration, the offset to the time slot or to the frequency may be a fixed number. For example, the second time slot may be determined by applying a delay of a fixed number of time slots to the first time slot. Similarly, the second frequency may be determined by applying a fixed frequency shift to the first frequency. In one configuration, the offset to the time slot or frequency may be derived based on a set of parameters that is known to all rebroadcasting devices (e.g., 804 and 806). In such configuration, the set of parameters may include one or more of: an index of the first time slot, an index of the first frequency, time of reception of the discovery message 810, or at least a portion of the content of the discovery message 810. Similarly, upon reception of the discovery message 810 on the D2D channel from the wireless device 802, the wireless device 806 determines (at 814) the MAC layer resource for rebroadcast (e.g., the second resource element corresponding to the second time slot and the second frequency) based on the MAC layer resource for receiving the discovery message 810 (e.g., the first resource element corresponding to the first time slot and the first frequency) in the same deterministic resource allocation manner as wireless device 804.

In one configuration, the wireless device 804 alters (at 816) the discovery message 810 for rebroadcast/relay in a deterministic message alteration manner. In one configuration, the deterministic message alteration manner may refer to the same processing/modification of the discovery message (e.g., 810) that may be performed by all re-broadcasters (e.g., 804 and 806) of the discovery message. In such configuration, all re-broadcasters of a discovery message alter/modify the discovery message in the same way, and generates identical altered discovery message for rebroadcast. In one configuration, the deterministic message alteration manner may refer to the deterministic change of a flag of the discovery message, such as the insertion of a rebroadcast flag in the discovery message. In one configuration, the deterministic message alteration manner may refer to one or more of: the increment of a hop counter, the update of a cyclic redundancy check (CRC) or message authenticator, or the encryption of the message. For message authentication and encryption, the same key may be used among all rebroadcasting devices of the same discovery message. Similarly, the wireless device 806 alters (at 818) the discovery message 810 for rebroadcast/relay in the same deterministic message alteration manner as wireless device 804.

Once the MAC layer resource for rebroadcast is determined in the deterministic resource allocation manner and the discovery message 810 is altered in the deterministic message alteration manner, the wireless device 804 may rebroadcast the discovery message 810 as an altered discovery message 820 through a D2D communication channel using the determined MAC layer resource (e.g., the second resource element) for rebroadcast. Similarly, once the MAC layer resource for rebroadcast is determined in the same deterministic resource allocation manner as wireless device 804 and the discovery message 810 is altered in the same deterministic message alteration manner as wireless device 804, the wireless device 806 may rebroadcast the discovery message 810 as the altered discovery message 820 through a D2D communication channel using the determined MAC layer resource (e.g., the second resource element) for rebroadcast.

The wireless device 808 may receive the rebroadcast/relayed discovery message 820 using the second resource element from both the wireless device 804 and the wireless device 806. The wireless device 808 may perform an OTA combining of the discovery message 820 signals received from the wireless devices 804 and 806, thus leading to a statistically higher signal strength for the discovery message 820.

In one configuration, a D2D channel may refer to a wireless protocol that permits exchange of discovery messages between wireless devices. Such a D2D channel may be provided by technologies such as LTE-D, near-me area network (NAN), Social WiFi, iBeacon, 802.11 ad-hoc mode, for instance. In one configuration, the D2D channel may share wireless resources such as spectrum with other wireless services. For example, a D2D channel based on LTE-Direct or WiFi-Direct may share wireless resources with other wireless services. In one configuration, D2D discovery may use dedicated wireless resources.

In one configuration, the rebroadcast/relay of the discovery message 820 occurs on a D2D channel used for proximity services. The D2D channel for rebroadcast/relay of discovery message 820 may be the same D2D channel as where the discovery message 810 is received.

In one configuration, synchronization of the wireless devices 802, 804, 806, and 808 may occur via a beacon signal supported by a wireless network infrastructure such as wireless access points or base stations in a cellular system. In one configuration, devices participating in D2D discovery (e.g., 802, 804, 806, and 808) may use GPS or other satellite-based timing systems for time synchronization. In one configuration, the devices participating in D2D discovery (e.g., 802, 804, 806, and 808) may mutually synchronize each others' clocks via periodic beacons transmitted and received.

In one configuration, the method of resource allocation for the relaying of D2D discovery messages may be applied to a time-unsynchronized system. In such configuration, devices may receive D2D discovery messages at any point in time, and the rebroadcast time may be set to a deterministic time frame after the time where the message is received. In such a case, the internal clock of all devices may be different. The resource allocation method may still be applicable as long as the drift among the internal clocks of the rebroadcast devices is small over the time frame between reception and rebroadcast of the discovery message.

Figure 9:
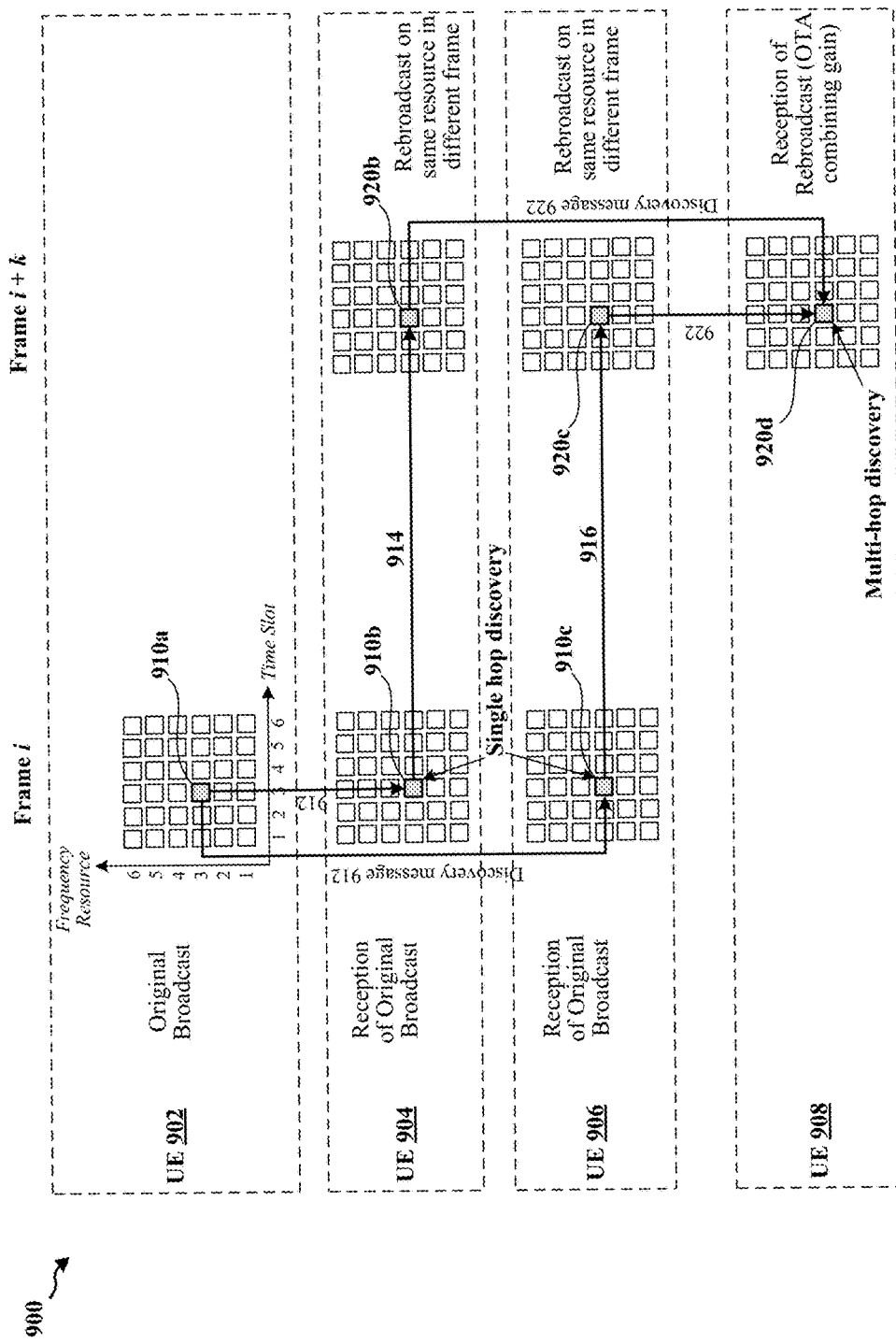
FIG. 9 is a diagram illustrating an example of resource allocation for relaying or rebroadcasting of discovery messages.

FIG. 9 is a diagram 900 illustrating an example of resource allocation for relaying or rebroadcasting of discovery messages. Specifically, this example shows that rebroadcast devices (e.g., UEs 904 and 906) use the same time slot and the same frequency resource within a frame that is a fixed number k of frames after the frame in which the original discovery message is received. In one configuration, this example of resource allocation for relaying or rebroadcasting of discovery messages may be used in the D2D communications system 800 described above with reference to FIG. 8.

In this example, UE 902 originally broadcast a discovery message 912 through a D2D communication channel using resource element 910*a* within a frame i. In one configuration, the UE 902 may be the wireless device 802 described above with reference to FIG. 8, and the original discovery message 912 may be the discovery message 810 described above with reference to FIG. 8. In one configuration, each frame may have 6 time slots and 6 frequency resources. In such configuration, the resource element 910*a* may be the time-frequency resource element corresponding to the third time slot and the third frequency resource. The discovery message 912 may be received by UE 904 using the same resource element 910*b* (e.g., corresponding to the third time slot and the third frequency resource) within the frame i. Similarly, the discovery message 912 may be received by UE 906 using the same resource element 910*c* within the frame i. The reception of original broadcast from the UE 902 by UEs 904 and 906 is a single hop discovery.

Upon reception of the discovery message 912 on the D2D channel from the UE 902, the UE 904 determines (at 914) to rebroadcast/relay the original discovery message using the same resource element 920b (e.g., corresponding to the third time slot and the third frequency resource) within frame i+k, which is a frame that is a fixed number k of frames after the frame i. Similarly, upon reception of the discovery message 912 on the D2D channel from the UE 902, the UE 906 determines (at 916) to rebroadcast/relay the original discovery message using the same resource element 920c (e.g., corresponding to the third time slot and the third frequency resource) within the frame i+k. In one configuration, the UEs 904 and 906 may be the wireless devices 804 and 806 described above with reference to FIG. 8, and the rebroadcast/relayed discovery message 922 may be the discovery message 820 described above with reference to FIG. 8.

UE 908 may receive signals of the rebroadcast/relayed discovery message 922 at the same resource element 920d (e.g., corresponding to the third time slot and the third frequency resource) within the frame i+k from both the UE 904 and the UE 906. In one configuration, the UE 908 may be the wireless device 808 described above with reference to FIG. 8. The reception of the rebroadcast/relayed discovery message 922 at the UE 908 is a multi-hop discovery. In one configuration, the UE 908 may perform an OTA combining of the discovery message signals received from the UEs 904 and 906, thus leading to a statistically higher signal strength for the rebroadcast/relayed discovery message.

In one configuration, rebroadcast of the same discovery message by multiple devices (e.g., UEs 904 and 906) may be coordinated by having each rebroadcasting device allocate (e.g., at 914 or 916) a time slot and frequency resource (e.g., the resource element 920) that is derived in a deterministic resource allocation manner from the time slot and frequency resource in which the original message is received (e.g., the resource element 910). In one configuration, the deterministic resource allocation manner may be the deterministic resource allocation manner described above with reference to FIG. 8. Further, all message alterations done prior to rebroadcast (e.g. such as changes to bit stream and waveform) may be executed in a deterministic message alteration manner. In one configuration, the deterministic message alteration manner may be the deterministic message alteration manner described above with reference to FIG. 8.

In one configuration, all rebroadcasts of the same discovery message may be superimposed on the same time-frequency resource (e.g., the resource element 920) and use the same waveform. This minimizes the resource utilization for message rebroadcast. It further avoids interference between the rebroadcasts of the same message. It further allows over-the-air combining of the waveform signals from multiple rebroadcasts at the antenna of a rebroadcast receiver, leading to a statistically higher signal strength.

In one configuration, the D2D communication channel used for discovery uses a time-synchronized frame structure, where each frame is subdivided into multiple time slots (e.g., six time slots within frame i). One example for such D2D communication channel is LTE. In one configuration, the rebroadcasting device (e.g., UE 904 or 906) determines the time slot (e.g., third time slot) within the frame where a discovery message is received (e.g., frame i). The rebroadcasting device then schedules the message for rebroadcast at the same time slot of the $k^{th}$ frame (e.g., frame i+k) after the frame where the message is received. The number k may advantageously be the same for all re-broadcasters (e.g., UEs 904 and 906) of the same discovery message. In one configuration, the number k may have been configured for all devices. In another configuration, the number k may be derived in a deterministic random resource allocation process based on information that is available to all re-broadcasters of the same discovery messages, such as content of the discovery message or the time when the reception of the discovery message occurs.

If the frequency band used for D2D discovery is divided into several frequency resources, such as in LTE Direct, the rebroadcasting device (e.g., UE 904 or 906) may determine the frequency resource where the discovery message is received (e.g., the third frequency resource), and select the same frequency resource when rebroadcasting the discovery message. The rebroadcasting device may select a different frequency resource in a deterministic resource allocation manner, i.e. in a manner that can be equally applied by all re-broadcasters of the same discovery message. For instance, in one configuration, the frequency resource for rebroadcast may be shifted by a fixed amount with respect to the frequency resource in which the discovery message is received. The amount of shift may depend on parameters such as the index of the initial frequency resource, the time of reception of the discovery message, at least a portion of the content of the discovery message, or other parameters that are known to all re-broadcasters of the same discovery message.

In one configuration, the resource allocation for relaying or rebroadcasting of discovery messages illustrated in FIG. 9 may be applied to LTE-Direct, which supports a time-synchronized frame structure and a division of the frequency band into several frequency resources. In other configurations, instead of frames, the resource allocation for relaying or rebroadcasting of discovery messages illustrated in FIG. 9 may be applied to other temporal structures, such as subframes, superframes, or Transmit Time Intervals (TTI), etc.

In one configuration, the rebroadcasting device (e.g., UE 904 or 906) may use the same frequency resource (e.g., the third frequency resource) in the frequency spectrum as where the original discovery message is received. In another configuration, the frequency resource used for rebroadcast may be shifted by a certain fixed or deterministic amount in the frequency spectrum from the frequency resource in which the original discovery message is received. In yet another configuration, the original broadcast and the relay/rebroadcast of the discovery message may operate without subdivision of the frequency band, i.e. where the entire frequency band is used for a discovery code transmission.

Figure 10:
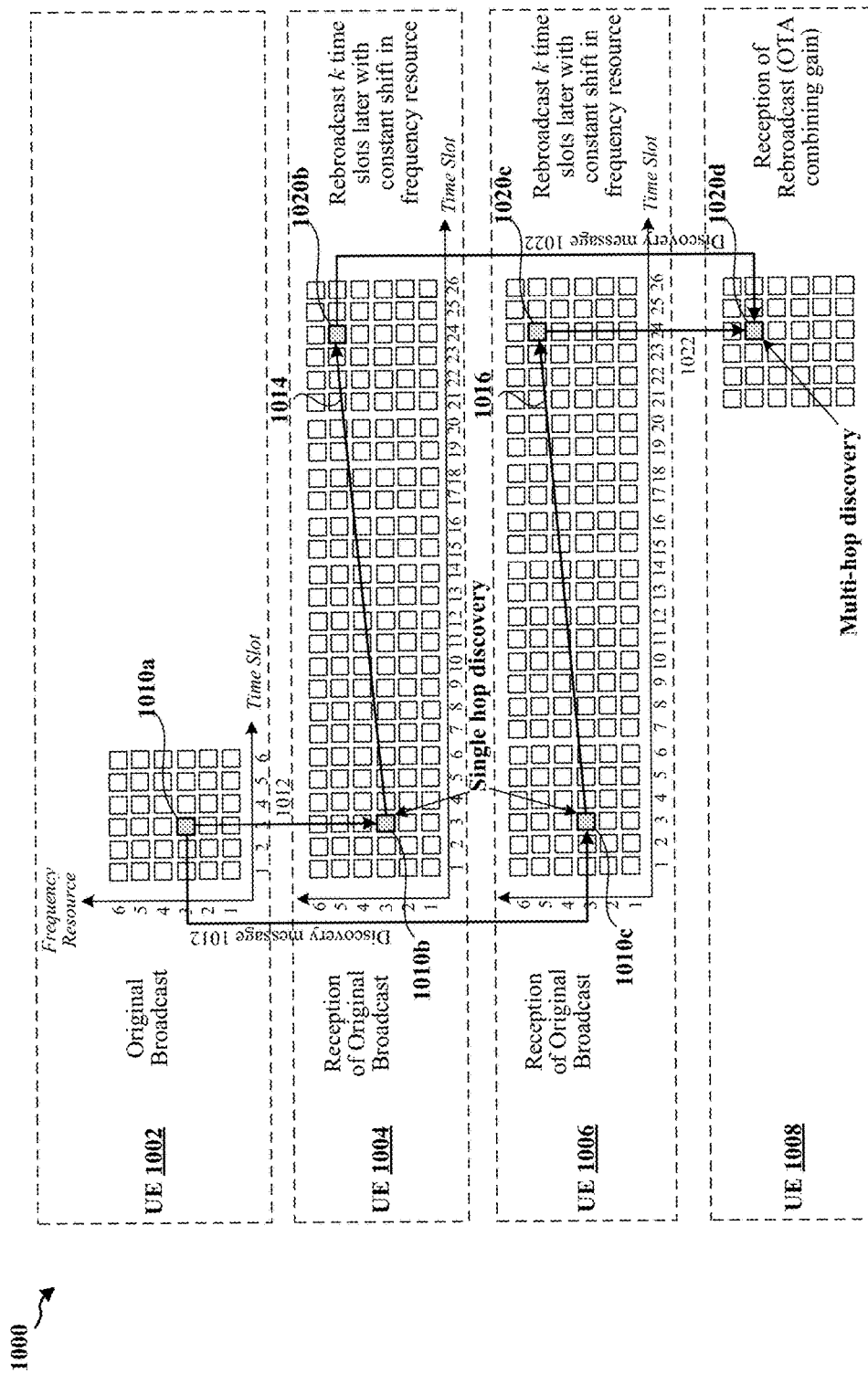
FIG. 10 is a diagram illustrating another example of resource allocation for relaying or rebroadcasting of discovery messages.

FIG. 10 is a diagram 1000 illustrating another example of resource allocation for relaying or rebroadcasting of discovery messages. Specifically, this example shows that rebroadcast devices (e.g., UEs 1004 and 1006) use a delay of a fixed number of k time slots and a constant shift in frequency resource with respect to the time slot and frequency resource where the original discovery message is received. In one configuration, this example of resource allocation for relaying or rebroadcasting of discovery messages may be used in the D2D communications system 800 described above with reference to FIG. 8.

In this example, UE 1002 originally broadcast a discovery message 1012 through a D2D communication channel using resource element 1010a. In one configuration, the UE 1002 may be the wireless device 802 described above with reference to FIG. 8, and the original discovery message 1012 may be the discovery message 810 described above with reference to FIG. 8. In one configuration, the resource element 1010a may be the time-frequency resource element corresponding to the third time slot and the third frequency resource. The discovery message 1012 may be received by UE 1004 using the same resource element 1010b (e.g., corresponding to the third time slot and the third frequency resource). Similarly, the discovery message 1012 may be received by UE 1006 using the same resource element 1010*c*. The reception of original broadcast from the UE 1002 by UEs 1004 and 1006 is a single hop discovery.

Upon reception of the discovery message 1012 on the D2D channel from the UE 1002, the UE 1004 determines (at 1014) to rebroadcast/relay the original discovery message using the resource element 1020*b* (e.g., corresponding to the 24th time slot and the fifth frequency resource), which is a fixed delay of 21 time slots and a constant shift of two frequency resources with respect to the resource element 1010*b*. Similarly, upon reception of the discovery message 1012 on the D2D channel from the UE 1002, the UE 1006 determines (at 1016) to rebroadcast/relay the original discovery message using the resource element 1020*c* (e.g., corresponding to the 24th time slot and the fifth frequency resource), which is a fixed delay of 21 time slots and a constant shift of two frequency resources with respect to the resource element 1010*c*. In one configuration, the UEs 1004 and 1006 may be the wireless devices 804 and 806 described above with reference to FIG. 8, and the rebroadcast/relayed discovery message 1022 may be the discovery message 820 described above with reference to FIG. 8.

UE 1008 may receive signals of the rebroadcast/relayed discovery message 1022 at the same resource element 1020*d* (e.g., corresponding to the 24th time slot and the fifth frequency resource) from both the UE 1004 and the UE 1006. In one configuration, the UE 1008 may be the wireless device 808 described above with reference to FIG. 8. The reception of the rebroadcast/relayed discovery message 1022 at the UE 1008 is a multi-hop discovery. In one configuration, the UE 1008 may perform an OTA combining of the discovery message signals received from the UEs 1004 and 1006, thus leading to a statistically higher signal strength for the rebroadcast/relayed discovery message.

In one configuration, rebroadcast of the same discovery message by multiple devices (e.g., UEs 1004 and 1006) may be coordinated by having each rebroadcasting device allocate a time slot and frequency resource (e.g., the resource element 1020) that is derived in a deterministic resource allocation manner from the time slot and frequency resource where the original message is received (e.g., the resource element 1010). In one configuration, the deterministic resource allocation manner may be the deterministic resource allocation manner described above with reference to FIG. 8. Further, all message alterations done prior to rebroadcast (e.g. such as changes to bit stream and waveform) may be executed in a deterministic message alteration manner. In one configuration, the deterministic message alteration manner may be the deterministic message alteration manner described above with reference to FIG. 8.

In one configuration, all rebroadcasts of the same discovery message may be superimposed on the same time-frequency resource (e.g., the resource element 1020) and use the same waveform. This minimizes the resource utilization for message rebroadcast. It further avoids interference between the rebroadcasts of the same message. It further allows over-the-air combining of the waveform signals from multiple rebroadcasts at the antenna of a rebroadcast receiver, leading to a statistically higher signal strength.

In one configuration, devices (e.g., UEs 1002, 1004, 1006, and 1008) are time-synchronized while a stringent frame structure is not supported. In such configuration, the delay between the reception of the original broadcast and the rebroadcast can be based on a time constant (e.g., 21 time slots), which may be fixed or may be derived in a deterministic resource allocation manner based on other information that is known to all re-broadcasters (e.g., UEs 1004 and 1006).

Figure 11:
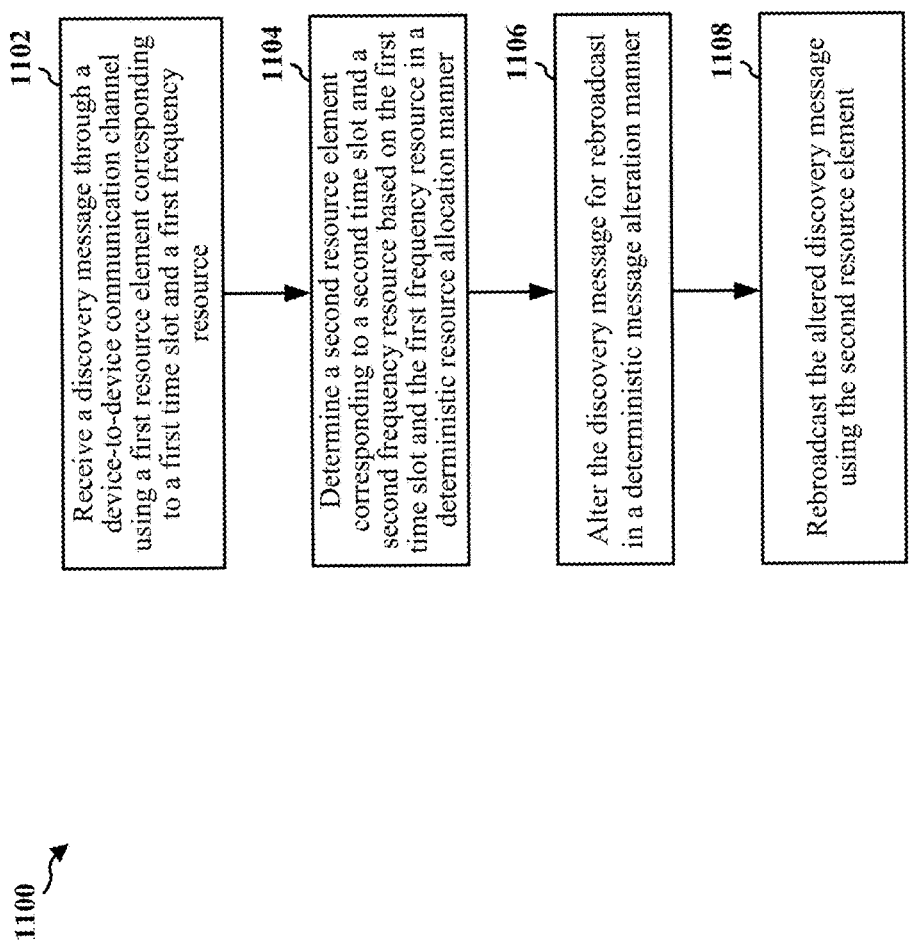
FIG. 11 is a flowchart of a method of wireless communication.

FIG. 11 is a flowchart 1100 of a method of wireless communication. Specifically, this figure illustrates a method of resource allocation for relaying or rebroadcasting of discovery messages. The method may be performed by a UE (e.g. the UE 102, 206, the device 804, 806, the UE 904, 906, 1004, 1006, or the apparatus 1202/1202'). At 1102, the UE receives a discovery message through a device-to-device communication channel using a first resource element corresponding to a first time slot and a first frequency resource. In one configuration, the received discovery message may be the discovery message 810, 912, or 1012 described above with reference to FIG. 8, 9, or 10, respectively. In one configuration, the first resource element may be the resource element 910 or 1010 described above with reference to FIG. 9 or 10. In one configuration, the D2D communication channel may be a wireless communication channel.

At 1104, the UE determines a second resource element corresponding to a second time slot and a second frequency resource based on the first time slot and the first frequency resource in a deterministic resource allocation manner. In one configuration, the second resource element may be the resource element 920 or 1020 described above with reference to FIG. 9 or 10. In one configuration, operations performed at 1104 may correspond to operations described above with reference to 812 or 814 of FIG. 8, or 914 or 916 of FIG. 9, or 1014 or 1016 of FIG. 10. In one configuration, the deterministic resource allocation manner may be the deterministic resource allocation manner described above with reference to FIG. 8.

In one configuration, the device-to-device communication channel may use a synchronized time slotted structure. The synchronized time slotted structure may be a frame, subframe, superframe, or TTI. For example, the synchronized time slotted structure may be the frame i or i+k described above with reference to FIG. 9. In such configuration, the first resource element may be a resource element (e.g., 910 of FIG. 9) within a first synchronized time slotted structure (e.g., the frame i of FIG. 9), and the second resource element may be the same resource element (e.g., 920 of FIG. 9) within a second synchronized time slotted structure (e.g., the frame i+k of FIG. 9) that is a fixed number of synchronized time slotted structures after the first synchronized time slotted structure.

In one configuration, the second time slot (e.g., the time slot of the resource element 1020 in FIG. 10) may be determined by applying a delay of a fixed number of time slots to the first time slot (e.g., the time slot of the resource element 1010 in FIG. 10). In one configuration, the second frequency resource (e.g., the frequency resource of the resource element 1020 in FIG. 10) may be determined by applying a shift to the first frequency resource (e.g., the frequency resource of the resource element 1010 in FIG. 10). In one configuration, the shift applied to the first frequency resource may be a fixed shift (e.g., a shift of two frequency resources). In another configuration, the shift applied to the first frequency resource may be derived based on a set of parameters that is known to all re-broadcasters. In such configuration, the set of parameters may include one or more of: an index of the first frequency resource, a time of reception of the discovery message, or at least a portion of the content of the discovery message.

At 1106, the UE may alter the discovery message for rebroadcast in a deterministic message alteration manner. In one configuration, operations performed at 1106 may correspond to operations described above with reference to 816 or 818 of FIG. 8. In one configuration, the deterministic message alteration manner may be the deterministic message alteration manner described above with reference to FIG. 8.

At 1108, the UE rebroadcasts the altered discovery message using the second resource element. In one configuration, the altered discovery message may be the discovery message 820, 922, or 1022 described above with reference to FIG. 8, 9, or 10, respectively. In one configuration, the altered discovery message may be rebroadcast through the same device-to-device communication channel through which the original discovery message is received.

Figure 12:
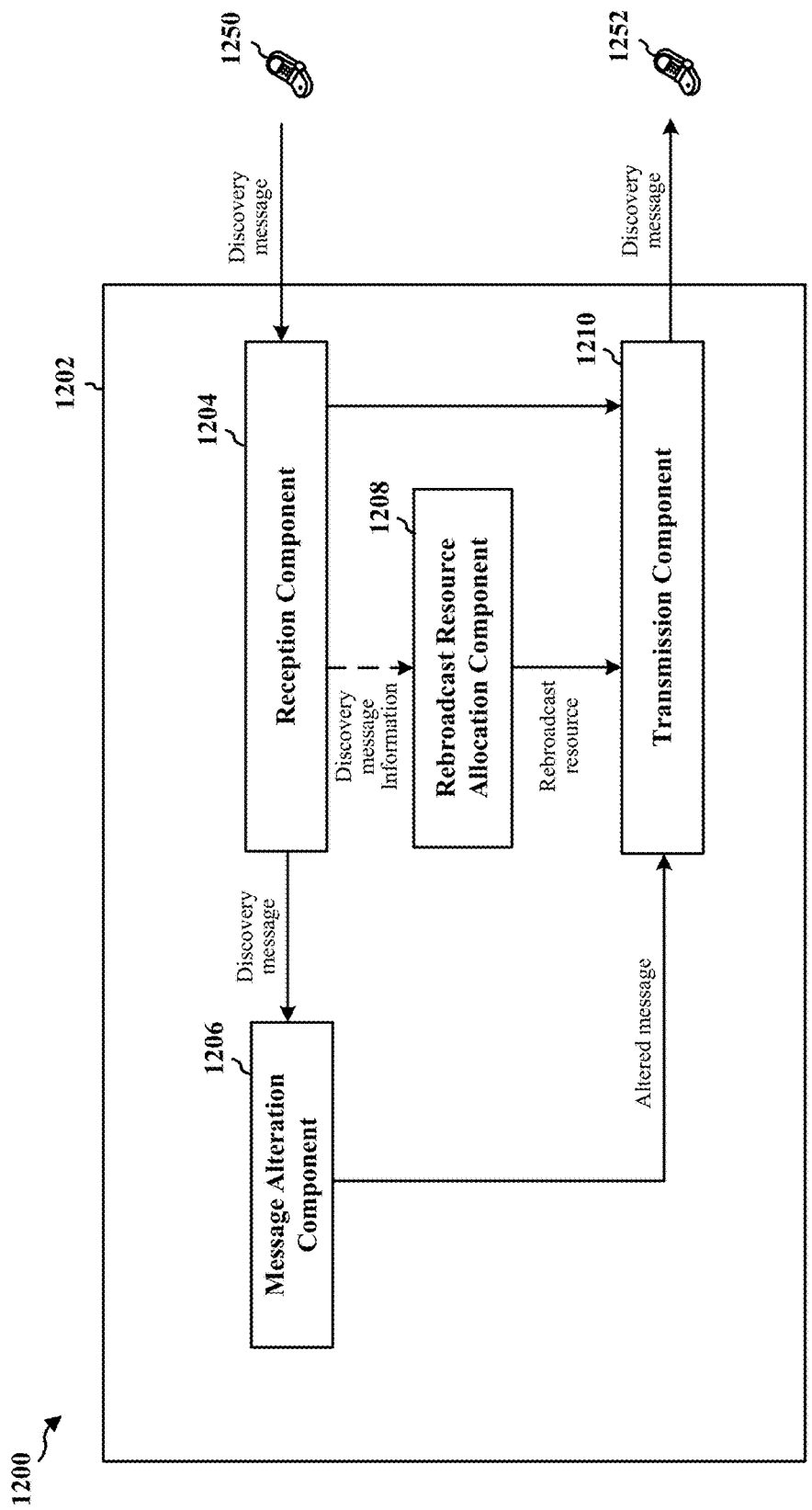
FIG. 12 is a conceptual data flow diagram illustrating the data flow between different means/components in an exemplary apparatus.

FIG. 12 is a conceptual data flow diagram 1200 illustrating the data flow between different means/components in an exemplary apparatus 1202. The apparatus 1202 may be a UE (e.g., 804, 806, 904, 906, 1004, or 1006). The apparatus 1202 includes a reception component 1204 that may receive discovery message from a peer UE 1250. In one configuration, the reception component 1204 may perform operations described above with reference to 1102 of FIG. 11.

The apparatus 1202 includes a transmission component 1210 that transmits/rebroadcast discovery message to a peer UE 1252. In one configuration, the transmission component 1210 may perform operations described above with reference to 1108 of FIG. 11. In one configuration, the reception component 1204 and the transmission component 1210 communicate with each other to coordinate communications for the apparatus 1202.

The apparatus 1202 may include a rebroadcast resource allocation component 1208 that determines the MAC layer resource for rebroadcast of the discovery message in a deterministic resource allocation manner. In one configuration, the rebroadcast resource allocation component 1208 may optionally receive discovery message information from the reception component 1204, and determines the MAC layer resource for rebroadcast based on the discovery message information. In such configuration, the discovery message information may include one or more of: an index of the time slot for receiving the discovery message, an index of the frequency resource for receiving the discovery message, time of reception of the discovery message, or at least a portion of the content of the discovery message. In one configuration, the rebroadcast resource allocation component 1208 may determine the MAC layer resource for rebroadcast using a fixed delay in time and/or a constant shift on frequency. In one configuration, the deterministic resource allocation manner may be the deterministic resource allocation manner described above with reference to FIG. 8. In one configuration, the rebroadcast resource allocation component 1208 may perform operations described above with reference to 812 or 814 of FIG. 8, 914 or 916 of FIG. 9, 1014 or 1016 of FIG. 10, or 1104 of FIG. 11.

The apparatus 1202 may include a message alteration component 1206 that may alter the discovery message in a deterministic message alteration manner. The message alteration component 1206 may receive the discovery message from the reception component 1204. In one configuration, the deterministic message alteration manner may be the deterministic message alteration manner described above with reference to FIG. 8. In one configuration, the message alteration component 1206 may perform operations described above with reference to 816 or 818 of FIG. 8, or 1106 of FIG. 11.

The apparatus 1202 may include additional components that perform each of the blocks of the algorithm in the aforementioned flowcharts of FIG. 11. As such, each block in the aforementioned flowcharts of FIG. 11 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

Figure 13:
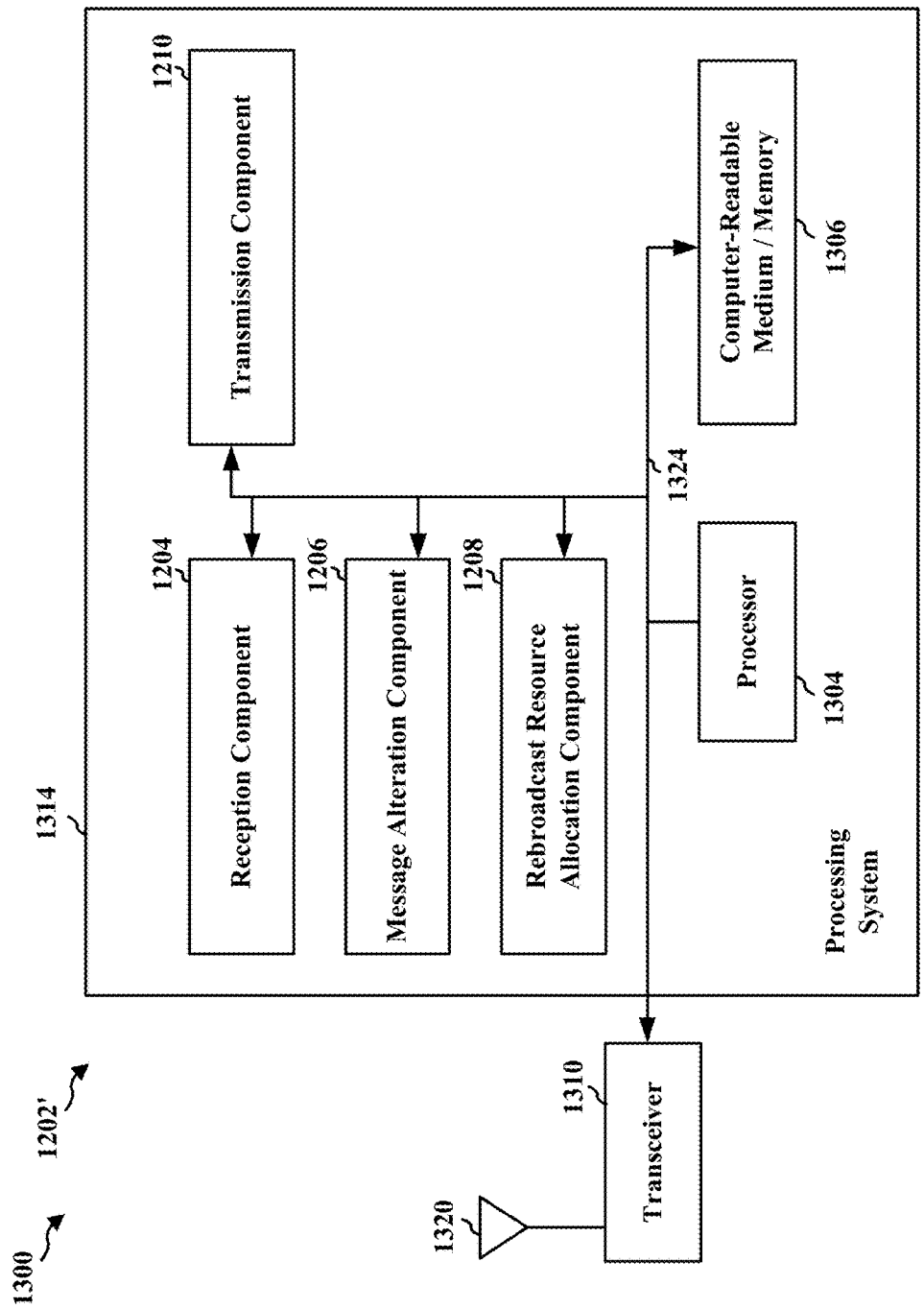
FIG. 13 is a diagram illustrating an example of a hardware implementation for an apparatus employing a processing system.

FIG. 13 is a diagram 1300 illustrating an example of a hardware implementation for an apparatus 1202' employing a processing system 1314. The processing system 1314 may be implemented with a bus architecture, represented generally by the bus 1324. The bus 1324 may include any number of interconnecting buses and bridges depending on the specific application of the processing system 1314 and the overall design constraints. The bus 1324 links together various circuits including one or more processors and/or hardware components, represented by the processor 1304, the components 1204, 1206, 1208, 1210 and the computer-readable medium/memory 1306. The bus 1324 may also link various other circuits such as timing sources, peripherals, voltage regulators, and power management circuits, which are well known in the art, and therefore, will not be described any further.

The processing system 1314 may be coupled to a transceiver 1310. The transceiver 1310 is coupled to one or more antennas 1320. The transceiver 1310 provides a means for communicating with various other apparatus over a transmission medium. The transceiver 1310 receives a signal from the one or more antennas 1320, extracts information from the received signal, and provides the extracted information to the processing system 1314, specifically the reception component 1204. In addition, the transceiver 1310 receives information from the processing system 1314, specifically the transmission component 1210, and based on the received information, generates a signal to be applied to the one or more antennas 1320. The processing system 1314 includes a processor 1304 coupled to a computer-readable medium/memory 1306. The processor 1304 is responsible for general processing, including the execution of software stored on the computer-readable medium/memory 1306. The software, when executed by the processor 1304, causes the processing system 1314 to perform the various functions described supra for any particular apparatus. The computer-readable medium/memory 1306 may also be used for storing data that is manipulated by the processor 1304 when executing software. The processing system 1314 further includes at least one of the components 1204, 1206, 1208, and 1210. The components may be software components running in the processor 1304, resident/stored in the computer readable medium/memory 1306, one or more hardware components coupled to the processor 1304, or some combination thereof. The processing system 1314 may be a component of the UE 650 and may include the memory 660 and/or at least one of the TX processor 668, the RX processor 656, and the controller/processor 659.

In one configuration, the apparatus 1202/1202' may include means for receiving a discovery message through a device-to-device communication channel using a first resource element corresponding to a first time slot and a first frequency resource. In one configuration, the means for receiving may be the transceiver 1310, the one or more antennas 1320, the reception component 1204, or the processor 1304. In one configuration, the means for receiving may perform operations described above with reference to 1102 of FIG. 11.

In one configuration, the apparatus 1202/1202' may include means for determining a second resource element corresponding to a second time slot and a second frequency resource based on the first time slot and the first frequency resource in a deterministic resource allocation manner. In one configuration, the means for determining may be the rebroadcast resource allocation component 1208 or the processor 1304. In one configuration, the means for determining may perform operations described above with reference to 812 or 814 of FIG. 8, 914 or 916 of FIG. 9, 1014 or 1016 of FIG. 10, or 1104 of FIG. 11.

In one configuration, the apparatus 1202/1202' may include means for altering the discovery message for rebroadcast in a deterministic message alteration manner. In one configuration, the means for altering the discovery message may be the message alteration component 1206 or the processor 1304. In one configuration, the means for altering the discovery message may perform operations described above with reference to 816 or 818 of FIG. 8, or 1106 of FIG. 11.

In one configuration, the apparatus 1202/1202' may include means for rebroadcasting the altered discovery message using the second resource element. In one configuration, the means for rebroadcasting the altered discovery message may be the transceiver 1310, the one or more antennas 1320, the transmission component 1210, or the processor 1304. In one configuration, the means for rebroadcasting the altered discovery message may perform operations described above with reference to 1108 of FIG. 11.

The aforementioned means may be one or more of the aforementioned components of the apparatus 1202 and/or the processing system 1314 of the apparatus 1202' configured to perform the functions recited by the aforementioned means. As described supra, the processing system 1314 may include the TX Processor 668, the RX Processor 656, and the controller/processor 659. As such, in one configuration, the aforementioned means may be the TX Processor 668, the RX Processor 656, and the controller/processor 659 configured to perform the functions recited by the aforementioned means.

It is understood that the specific order or hierarchy of blocks in the processes/flowcharts disclosed is an illustration of exemplary approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "at least one of A, B, and C," and "A, B, C, or any combination thereof" include any combination of A, B, and/or C, and may include multiples of A, multiples of B, or multiples of C. Specifically, combinations such as "at least one of A, B, or C," "at least one of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed as a means plus function unless the element is expressly recited using the phrase "means for."

What is claimed is:

1. A method of wireless communication, comprising:
   receiving a discovery message through a device-to-device communication channel using a first resource element corresponding to a first time slot and a first frequency resource;
   determining a second resource element corresponding to a second time slot and a second frequency resource based on the first time slot and the first frequency resource in a deterministic resource allocation manner; and
   rebroadcasting the discovery message using the second resource element.

2. The method of claim 1, wherein the device-to-device communication channel uses a synchronized time slotted structure, wherein the synchronized time slotted structure is one of a frame, a subframe, a superframe, or a Transmission Time Interval (TTI).

3. The method of claim 2, wherein the first resource element is within a first synchronized time slotted structure, wherein the second resource element is a same resource element as the first resource element and is within a second synchronized time slotted structure that is a fixed number of synchronized time slotted structures after the first synchronized time slotted structure.

4. The method of claim 1, wherein the second time slot is determined by applying a delay of a fixed number of time slots to the first time slot.

5. The method of claim 4, wherein the second frequency resource is determined by applying a shift to the first frequency resource.

6. The method of claim 5, wherein the shift is a fixed shift.

7. The method of claim 5, wherein the shift is derived based on a set of parameters that is known to all rebroadcasters.

8. The method of claim 7, wherein the set of parameters comprise one or more of an index of the first frequency resource, a time of reception, or at least a portion of content of the discovery message.

9. The method of claim 1, wherein the device-to-device communication channel is a wireless communication channel.

10. The method of claim 1, further comprising altering the discovery message for rebroadcast in a deterministic message alteration manner.

11. The method of claim 1, wherein the discovery message is rebroadcast through the device-to-device communication channel.

12. An apparatus for wireless communication, comprising:

means for receiving a discovery message through a device-to-device communication channel using a first resource element corresponding to a first time slot and a first frequency resource;

means for determining a second resource element corresponding to a second time slot and a second frequency resource based on the first time slot and the first frequency resource in a deterministic resource allocation manner; and means for rebroadcasting the discovery message using the second resource element.

13. The apparatus of claim 12, wherein the device-to-device communication channel uses a synchronized time slotted structure, wherein the synchronized time slotted structure is one of a frame, a subframe, a superframe, or a Transmission Time Interval (TTI).

14. The apparatus of claim 13, wherein the first resource element is within a first synchronized time slotted structure, wherein the second resource element is a same resource element as the first resource element and is within a second synchronized time slotted structure that is a fixed number of synchronized time slotted structures after the first synchronized time slotted structure.

15. The apparatus of claim 12, wherein the second time slot is determined by applying a delay of a fixed number of time slots to the first time slot.

16. The apparatus of claim 15, wherein the second frequency resource is determined by applying a shift to the first frequency resource.

17. The apparatus of claim 16, wherein the shift is a fixed shift.

18. The apparatus of claim 16, wherein the shift is derived based on a set of parameters that is known to all re-broadcasters.

19. The apparatus of claim 18, wherein the set of parameters comprise one or more of an index of the first frequency resource, a time of reception, or at least a portion of content of the discovery message.

20. The apparatus of claim 12, further comprising means for altering the discovery message for rebroadcast in a deterministic message alteration manner.

21. An apparatus for wireless communication, comprising:
   a memory; and
   at least one processor coupled to the memory and configured to:
      receive a discovery message through a device-to-device communication channel using a first resource element corresponding to a first time slot and a first frequency resource;
      determine a second resource element corresponding to a second time slot and a second frequency resource based on the first time slot and the first frequency resource in a deterministic resource allocation manner; and
      rebroadcast the discovery message using the second resource element.

22. The apparatus of claim 21, wherein the device-to-device communication channel uses a synchronized time slotted structure, wherein the synchronized time slotted structure is one of a frame, a subframe, a superframe, or a Transmission Time Interval (TTI).

23. The apparatus of claim 22, wherein the first resource element is within a first synchronized time slotted structure, wherein the second resource element is a same resource element as the first resource element and is within a second synchronized time slotted structure that is a fixed number of synchronized time slotted structures after the first synchronized time slotted structure.

24. The apparatus of claim 21, wherein the second time slot is determined by applying a delay of a fixed number of time slots to the first time slot.

25. The apparatus of claim 24, wherein the second frequency resource is determined by applying a shift to the first frequency resource.

26. The apparatus of claim 25, wherein the shift is a fixed shift.

27. The apparatus of claim 25, wherein the shift is derived based on a set of parameters that is known to all re-broadcasters.

28. The apparatus of claim 27, wherein the set of parameters comprise one or more of an index of the first frequency resource, a time of reception, or at least a portion of content of the discovery message.

29. The apparatus of claim 21, wherein the at least one processor is further configured to alter the discovery message for rebroadcast in a deterministic message alteration manner.

30. A non-transitory computer-readable medium storing computer executable code for wireless communication, comprising code for:
   receiving a discovery message through a device-to-device communication channel using a first resource element corresponding to a first time slot and a first frequency resource;
   determining a second resource element corresponding to a second time slot and a second frequency resource based on the first time slot and the first frequency resource in a deterministic resource allocation manner; and
   rebroadcasting the discovery message using the second resource element.

* * * * *